United States Patent [19]
Akita et al.

[11] 3,944,981
[45] Mar. 16, 1976

[54] ELECTRICAL WIRING SYSTEM

[75] Inventors: Shigeyuki Akita, Okazaki; Osamu Ito, Toyota, both of Japan

[73] Assignee: Nippondenso Co., Ltd., Kariya, Japan

[22] Filed: Sept. 10, 1974

[21] Appl. No.: 504,983

[30] Foreign Application Priority Data
Sept. 14, 1973 Japan............................. 48-104430

[52] U.S. Cl....... 340/147 R; 340/310 R; 340/310 A
[51] Int. Cl.² ......................................... H04Q 11/00
[58] Field of Search...... 340/147 SY, 310 R, 310 A, 340/147 CN, 147 R

[56] References Cited
UNITED STATES PATENTS
3,541,552   11/1970   Carlson.......................... 340/147 SY
3,828,313   8/1974   Schull .......................... 340/147 SY Primary Examiner—Harold I. Pitts
Attorney, Agent, or Firm—Cushman, Darby & Cushman

[57] ABSTRACT

An electrical wiring system in which a plurality of automobile electrical devices and instruction switches for oeprating the electrical devices are interconnected through a single signal line. The transmission of command signals from an instruction unit to the plurality of electrical devices is performed on a time-division multiplex signal transmission basis, and synchronizing high frequency pulse signals and command pulse signals are superposed to form a multiplexed signal so that the signal transmission is accomplished through the single signal line.

6 Claims, 8 Drawing Figures

ELECTRICAL WIRING SYSTEM

BACKGROUND OF THE INVENTION

1. Field of the Invention

The present invention relates to electrical wiring systems and more particularly to an electrical wiring system in which a plurality of automobile electrical devices and instruction switches for operating the electrical devices are interconnected through two power supply lines and a single signal line.

2. Description of the Prior Art

In conventional electrical wiring systems for automobiles, as many separate electrical wires as there are loads or electrical devices are required to transmit power between the electrical devices and the associated instruction switches. Consequently, a large number of heavy power transmission wires must be used thus not only increasing the cost of wiring an automobile, but also increasing the volume of the wires and making it difficult to wire up the various electrical devices in the limited space of the automobile. Another disadvantage is the increased probability of causing short circuits between the electrical devices and the vehicle body.

SUMMARY OF THE INVENTION

With a view to overcoming the foregoing difficulties, it is the object of the present invention to provide an electrical wiring system wherein the transmission of actuating command signals from an instruction unit to a plurality of loads associated with the instruction unit is performed on the basis of a time-sharing multiplex signal transmission method. Sychronizing high frequency pulse signals and command pulses for the above commands are superposed in a multiplexed signal, whereby the signal transmission is accomplished by means of a single signal line in addition to two power supply lines, and whereby all the signal processing can be accomplished by means of a single code. This prevents the loads from being operated erroneously by various noises and simplifies the wiring operation.

The system provided according to the present invention has among its great advantages the fact that since the transmission of signals can be accomplished with only a single signal line in addition to two power supply lines, and since a plurality of loads can be selectively operated as desired in accordance with the commands from an instruction unit, the required wiring design for transmitting the signals to the loads as well as the wiring operation, can be simplified. As a result, the system is very useful as a means of wiring automobiles where the complicated wiring operation must be effected in a limited space. Moreover, the fact that all the signal processing is effected with a single code enables the system to function with a high degree of stability against such disturbances as noise and variations of the power supply voltage.

DESCRIPTION OF THE PREFERRED EMBODIMENTS

Figure 1:
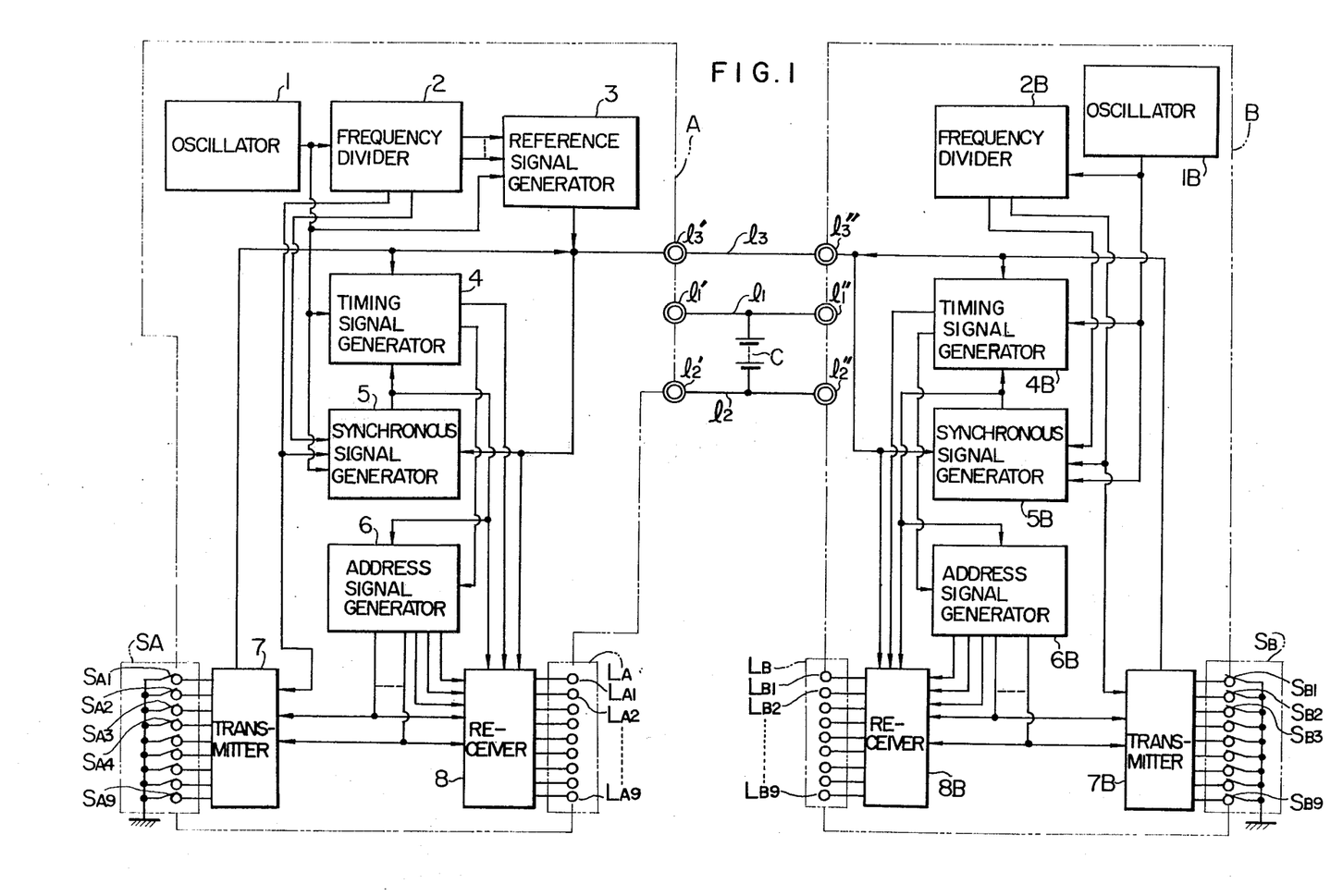
FIG. 1 is a block diagram showing the general construction of an electrical wiring system according to one embodiment of the invention.

The present invention will now be described with reference to the illustrated embodiment. Referring first to the block diagram of FIG. 1 showing the general constructinn of the system of this invention, the computer of a block A (hereinafter referred to as a local A) and the computer of a block B (hereinafter referred to as a local B) are supplied with power from a battery C through power supply lines $l_1$ and $l_2$, and the transmission of signals is effected through a single signal line $l_3$. Symbols $S_A$ and $S_B$ designate instruction units respectively comprising normally-closed switches $S_{A1}$ through $S_{A9}$ and $S_{B1}$ through $S_{B9}$ which are provided to associate with the corresponding electrical devices. Symbols $L_A$ and $L_B$ designate load groups respectively shown in the form of output terminals $L_{A1}$ through $L_{A9}$ and $L_{B1}$ through $L_{B9}$ which actuate the loads or electrical devices corresponding to the switches $S_{A1}$ through $S_{A9}$ and $S_{B1}$ and $S_{B9}$, respectively.

In the local A, numeral 1 designates an oscillator constituting a constant frequency source which may for example be oscillated at a constant frequency of 32 KHz to generate output pulse signals. Numeral 2 designates a frequency divider for dividing the frequency of the output pulse signal of the oscillator 1, 3 a reference signal generator for generating a reference signal whose period corresponds to a plurality of cycles of the frequency divided signal divided by the frequency divider 2 and which has the high frequency pulses from the oscillator 1 superposed in the initial first cycle, 4 a timing signal generator for generating, from the oscillator output pulse signal and the reference signal, a signal which is distributed to allot the respective electrical devices and the associated normally-closed switches to the time-shared addresses (hereinafter referred to as timing signals), 5 a synchronous signal generator for generating signals which synchronize the transmission of signals in the locals A and B (hereinafter referred to as synchronous signals), 6 an address signal generator for generating, from the timing signals, address signals which designate the addresses of the respective electrical devices and the normally-closed switches in the corresponding cycles of the frequency divided signal, 7 a transmitter for generating, from the address signals and signals generated by the opening of selected one of the normally-closed switches $S_{A1}$ through $S_{A9}$ in the instruction unit $S_A$, a signal having command pulses superposed in the cycles corresponding to the designated addresses to actuate the electrical devices associated with the opened switches (hereinafter referred to as a multiplexed signal), 8 a receiver for actuating the electrical devices selectively designated by the address signals and the multiplexed signal.

The frequency divider 2 and the reference signal generator 3 constitute a reference signal generating circuit, and the timing signal generator 4, synchronous signal generator 5 and address signal generator 6 constitute an address designating circuit. In the local B which is identical in construction with the above-described local A except for the reference signal generator 3, numeral 1B designates an oscillator, 2B a frequency divider, 4B a timing signal generator, 5B a synchronous signal generator, 6B an address signal generator, 7B a transmitter, 8B a receiver.

Figure 2:
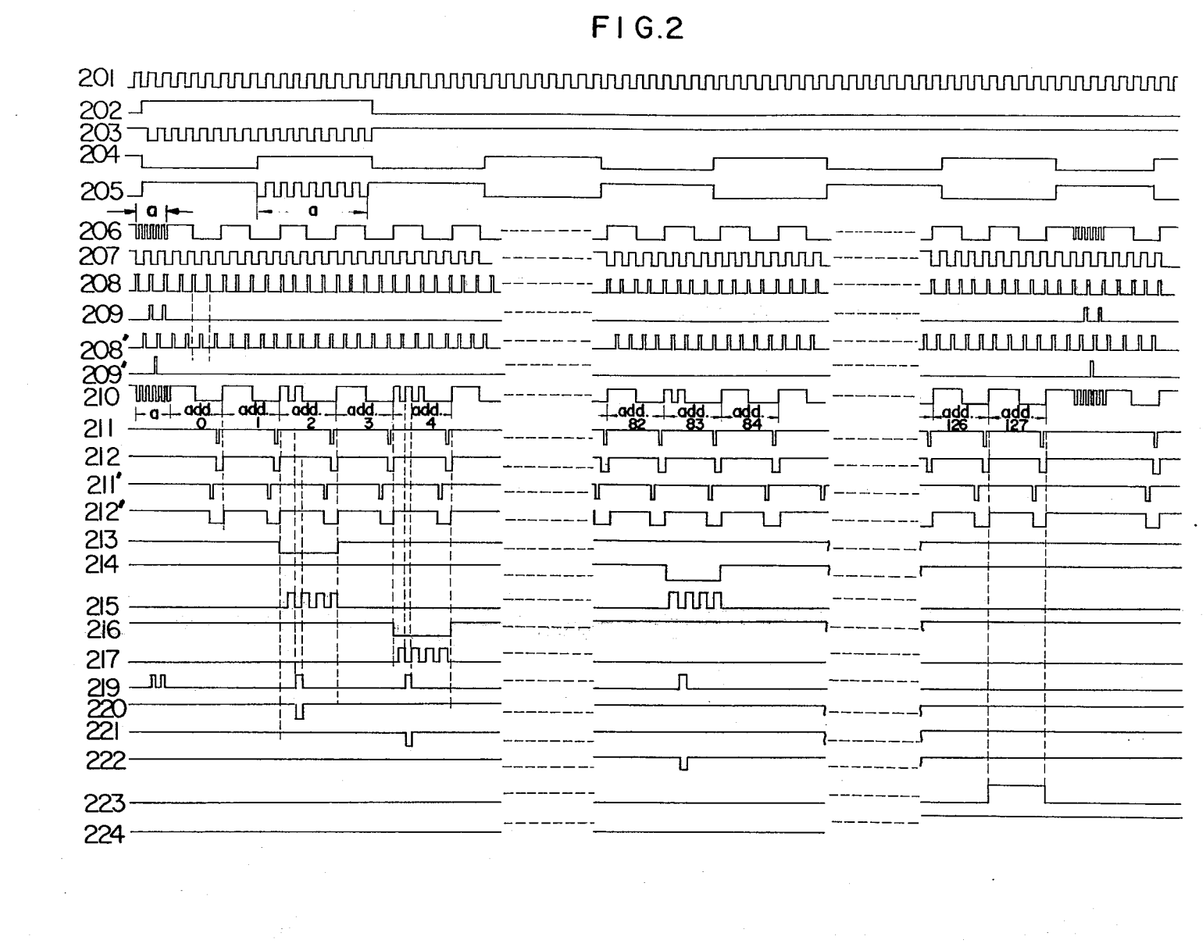
FIG. 2 shows the voltage waveforms generated at various points in FIG. 1, which are useful for explaining the operation of the embodiment shown in FIG. 1.
Figure 3:
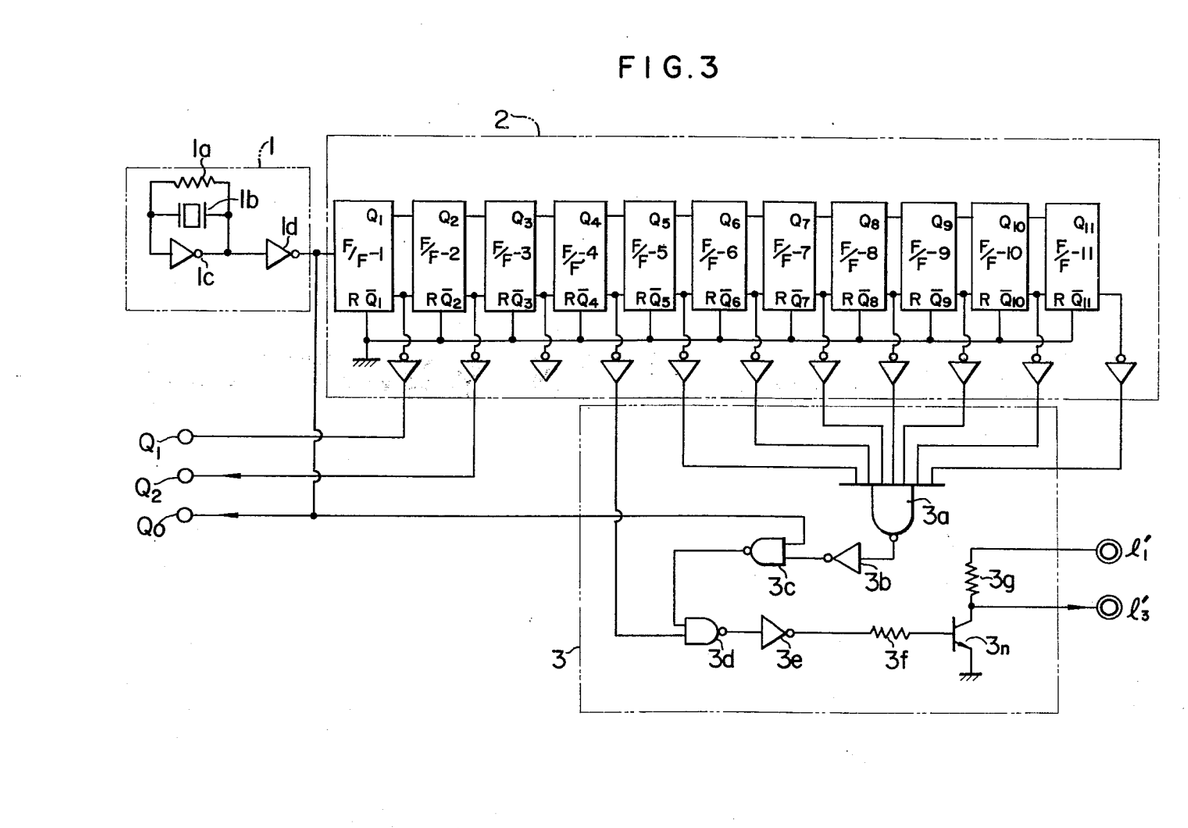
FIG. 3 is a wiring diagram showing the detailed circuit constructions of the oscillator, frequency divider and reference signal generator used in the embodiment of FIG. 1.

The detailed construction and operation of the above-described embodiment will now be described with reference to the voltage waveforms shown in FIG. 2. Referring first to FIG. 3, there is illustrated a wiring diagram of the circuit for generating a reference signal. In FIG. 3, the oscillator 1 comprises a resistor 1a, a crystal resonator 1b and inverting gates 1c and 1d, and it generates the output pulse signal shown at 201 in FIG. 2 at the output of the inverting gate 1d. The oscillator output pulse signal 201 is applied to the frequency divider 2 where the signal is subjected to the frequency divisions of ½, ¼, ⅛, ..., 1/512, 1/1024 and 1/2048 by a cascade circuit of eleven flip-flops F/F-1, F/F-2, ..., F/F-11. The output signals of the fifth stage, sixth stage, seventh stage, eighth stage, ninth stage, 10th stage and 11th stage flip-flops, i.e., F/F-5 through F/F-11 in the frequency divider 2 are applied to a NAND gate 3a in the reference signal generator 3, and the output of the NAND gate 3a is inverted by an inverting gate 3b to produce the signal shown at 202 in FIG. 2. The signals shown respectively at 201 and 202 in FIG. 2 are then applied to the inputs of a NAND gate 3c which in turn produces the output signal shown at 203 in FIG. 2. The signal 203 is then applied to one input of a NAND gate 3d whose other input receives the output of the 4th stage F/F-4 in the frequency divider 2 or the frequency divided signal shown at 204 in FIG. 2. Consequently, the NAND gate 3d produces at its output a signal representing the logical product of the signal 203 and the signal 204. The signal is inverted by an inverting gate 3e and it is then applied through a resistor 3f to the base of a transistor 3h thus producing at an output terminal $l'_3$ the reference signal shown at 205 in FIG. 2, whose period corresponds to a plurality of cycles of the frequency divided signal and in which the oscillator output pulses or high frequency pulses are superposed in the initial first cycle. Therefore, by connecting the output terminal $l'_3$ to the signal line $l_3$ shown in FIG. 1, the reference signal 205 may be transmitted to the other local.

Next, the address designating circuit shown in FIG. 4 will be described. The output pulse signal 201 of the oscillator 1 is delivered from a terminal $Q_o$ of FIG. 3 to a terminal $Q_o$ in FIG. 4. The output signal of the 1st stage F/F-1 in the frequency divider 2 of FIG. 3 is delivered from a terminal $Q_1$ of FIG. 3 to a terminal $Q_1$ of FIG. 4. Similarly, the output signal of the 2nd stage F/F-2 in the frequency divider 2 is delivered from a terminal $Q_2$ of FIG. 3 to a terminal $Q_2$ in FIG. 4. Consequently, the signals applied to the terminals $Q_o$, $Q_1$ and $Q_2$ are applied to the inputs of a NAND gate 5a in the synchronous signal generator 5 whose output signal is in turn inverted by an inverting gate 5b and the signal shown at 208 in FIG. 2 is thus applied to a reset terminal $5c_2$ in a decoding counter/driver circuit 5c (hereinafter referred to as a dividing circuit). The circuit performance characteristics of the dividing circuit 5c may be satisfied by the known C-MOS CD 4017 manufactured by Radio Corporation of America.

Figure 4:
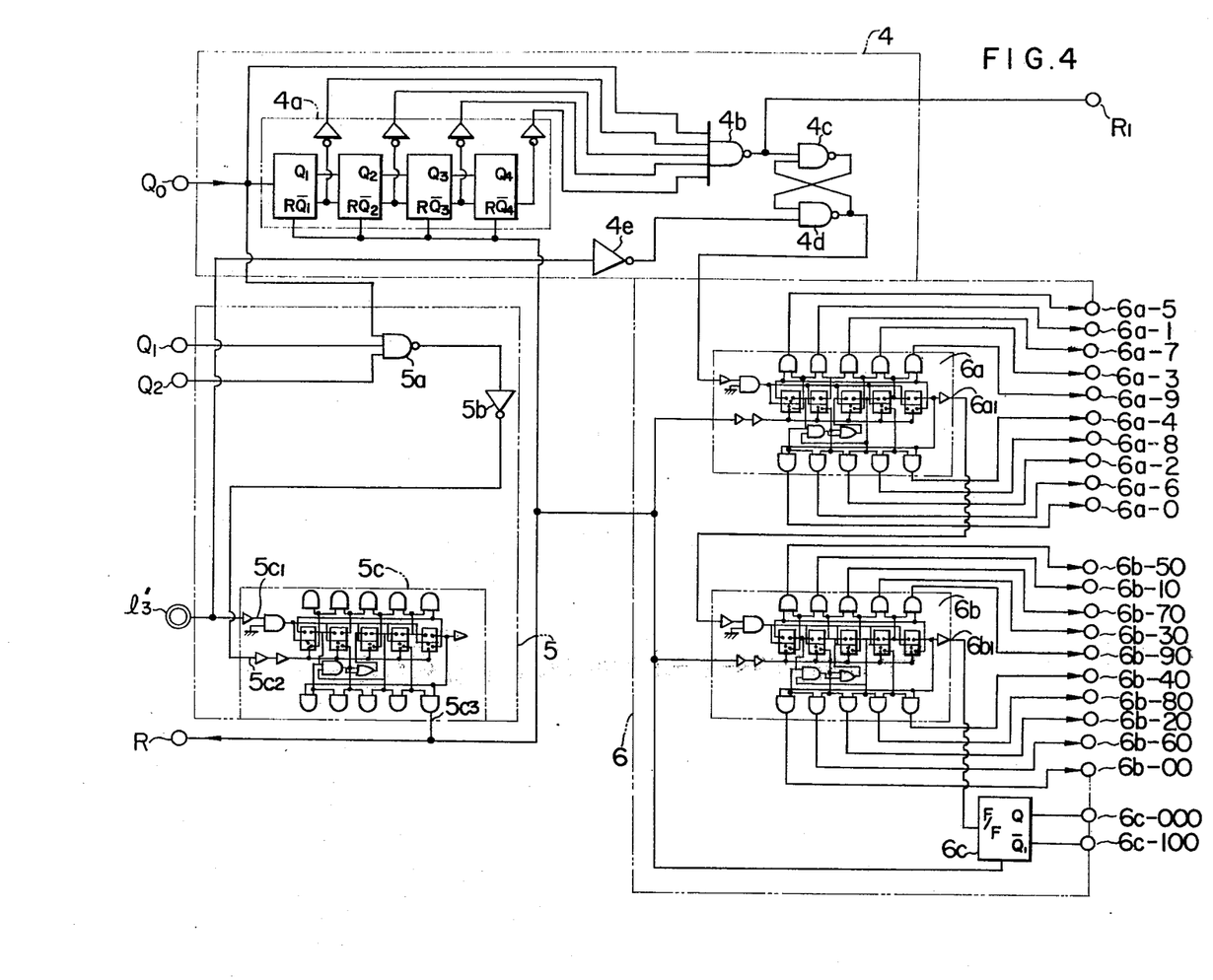
FIG. 4 is a wiring diagram showing the detailed circuit constructions of the timing signal generator, synchronous signal generator and address signal generator used in the embodiment of FIG. 1.

Since a terminal $l'_3$ in FIG. 4 is connected to the signal line $l_3$ in FIG. 1, it receives the reference signal shown at 206 in FIG. 2. FIG. 2-205 shows in an enlarged form the same reference signal as the one shown in FIG. 2-206. The reference signal 205 is included to illustrate by enlargement that the reference signal 206 contains in its interval $a$ eight pulses of the oscillator output pulse signal 201, and the reference signal 206 is applied to an input terminal $5c_1$. In this case, since the reset signal shown in FIG. 2-208 is applied to the reset terminal $5c_2$, the dividing circuit 5c is permitted to count more than four pulses only during the interval $a$ of the reference signal 206, and it generates at its output terminal $5c_3$ the synchronous signal shown at 209 in FIG. 2 and representing the arrival of the four pulses. The synchronous signal is applied to the reset terminals of a counter 4a in the timing signal generator 4, dividing circuits 6a and 6b in the address signal generator 6 and a flip-flop 6c. The synchronous signal is also applied to a terminal R from which it is delivered to the receiver 8 that will be described later. In the timing signal generator 4, the oscillator output pulse signal is applied from the terminal $Q_o$ to the input of the counter 4a so that the logical operation is performed on the oscillator output pulse signal and the output signals of the respective flip-flops by a NAND gate 4b which in turn produces at its output the signal shown at 211 in FIG. 2. The signal 211 is applied to the reset input of an R-S flip-flop comprising NAND gates 4c and 4d and the other set input receives the reference signal 206 applied to the terminal $l'_3$ and inverted by an inverting gate 4e, thus producing at the output of the NAND gate 4d the timing signal shown at 212 in FIG. 2.

Figure 5:
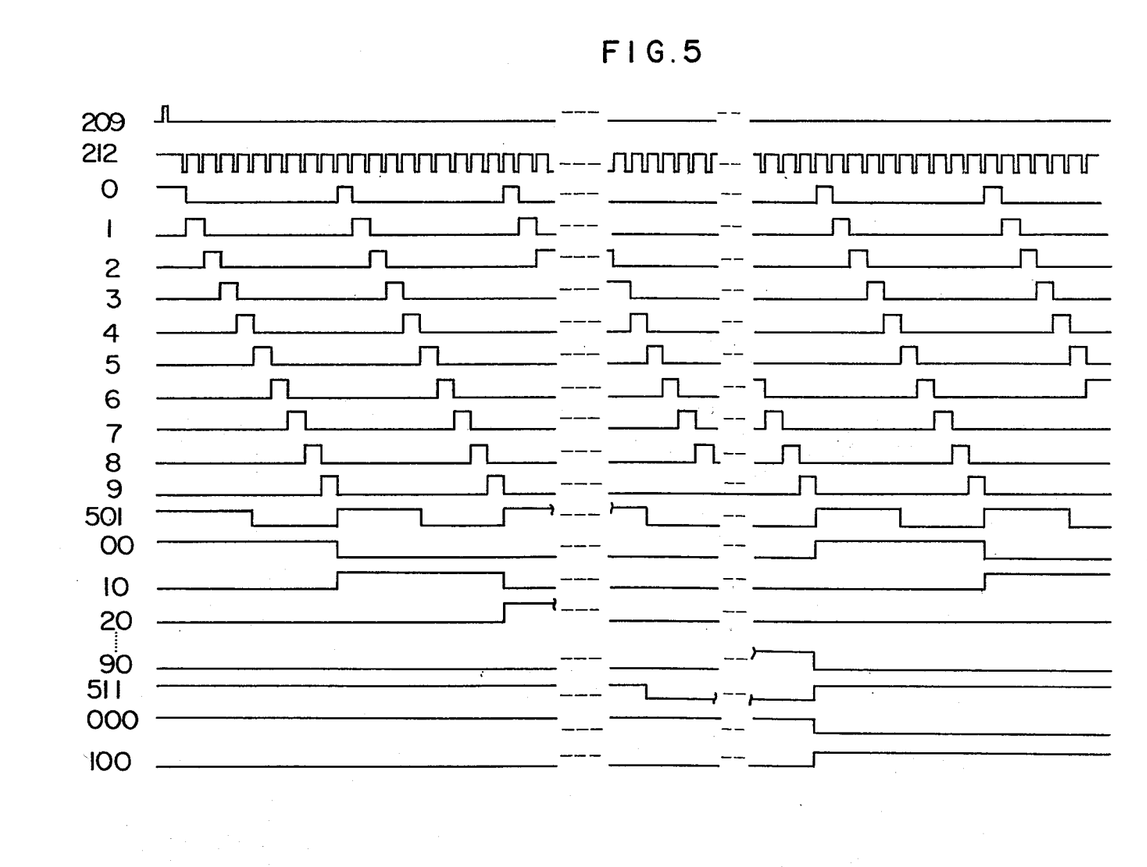
FIG. 5 is a diagram showing the voltage waveforms which are useful for explaining the operation of the address signal generator shown in FIG. 4.

Next, the address signal generator 6 which divides the timing signal 212 to generate address signals will be described with reference to the voltage waveforms shown in FIG. 5. The timing signal 212 is applied to the clock input of the first dividing circuit 6a so that the divided address signals shown at 0, 1 ..., 9 in FIG. 5 are produced at the respective outputs 6a-0, 6a-1, ..., 6a-9 of the first dividing circuit 6a, and the pulse signal shown at 501 in FIG. 5 is generated at an output terminal $6a_1$ at the rate of one pulse for every ten pulses of the timing signal 212 or the clock input. The pulse signal 501 is applied to the clock input of the second dividing circuit 6b. Consequently, in the same manner as in the case of the first dividing circuit 6a, the divided signals shown at 00, 10, ..., 90 in FIG. 5 are generated as the output signals of the second dividing circuit 6b. Also in a like manner as with the first dividing circuit 6a, one pulse is generated at an output terminal $6b_1$ of the second dividing circuit 6b for every 10 pulses of the applied clock input signal 501, and this output pulse signal 511 is then applied to the clock input of the flip-flop 6c to generate at its output terminals 6c-000 and 6c-100 the signals shown at 000 and 100 in FIG. 5. By the operation described so far, the first place digit of the address signal is produced by the first dividing circuit 6a, the second place digit by the second dividing circuit 6b and the third place digit by the flip-flop 6c. Accordingly, the designation of addresses is accomplished in the following manner. For instance, when it is desired to produce the signal representing the address 2, it may be obtained by producing the logical product of the signals appearing at the terminals 6a-2, 6b-00 and 6c-000, whereas the signal representing the address 23 may be obtained by producing the logical product of the signals appearing at the terminals 6a-3, 6b-20 and 6c-000. In a like manner, the signal representing the address 112 may be obtained by producing the logical product of the signals appearing at the terminals 6a-2, 6b-10 and 6c-100.

Figure 6:
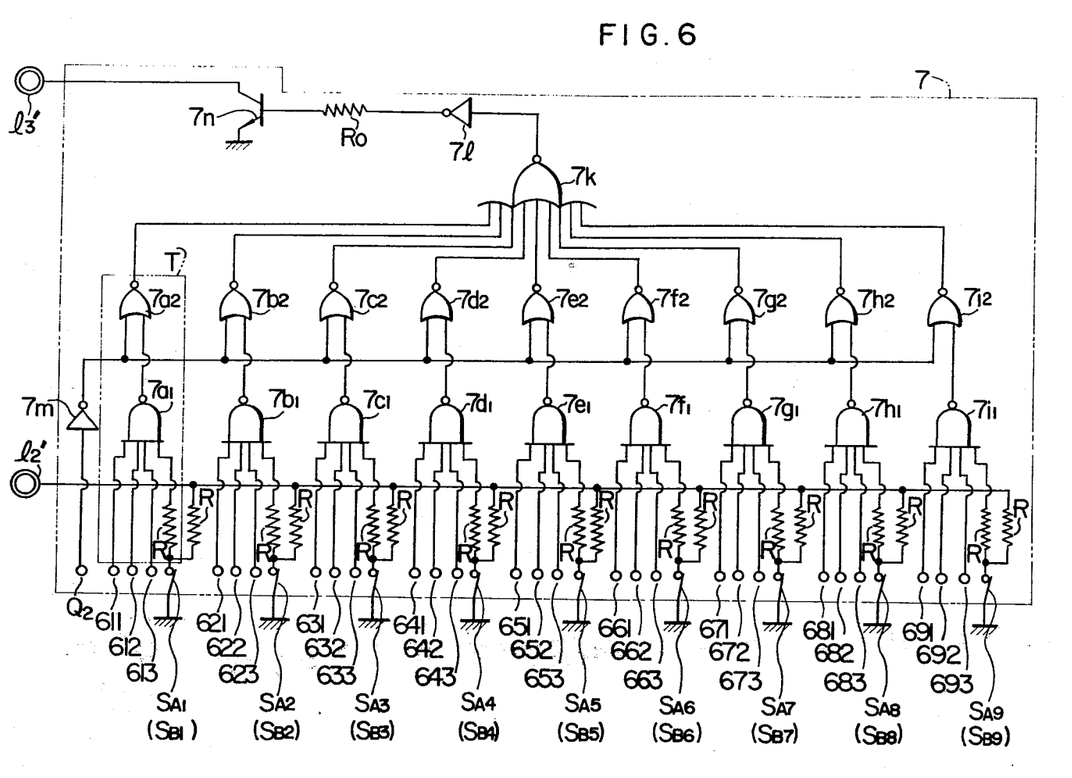
FIG. 6 is a wiring diagram showing the detailed circuit construction of the transmitter used in the embodiment of FIG. 1.

The transmitter 8 which transmits, in accordance with the above-described address designation, the command signals for actuating the respective electrical devices will now be described. Referring to FIG. 6, the normally-closed switches $S_{A1}$ through $S_{A9}$ are the same as the normally-closed switches $S_{A1}$ through $S_{A9}$ shown in FIG. 1, and these switches produce instructions for actuating the various electrical devices and are provided to associate with the corresponding electrical devices. Assuming now that the switch $S_{A1}$ corresponds to the address 2, the signal representing the address 2 is obtained by connecting the terminal 6a-2 of FIG. 4 to a terminal 611 in FIG. 6, the terminal 6b-00 of FIG. 4 to a terminal 612 in FIG. 6 and the terminal 6c-000 of FIG. 4 to a terminal 613 in FIG. 6. In other words, when the switch $S_{A1}$ is open and the signals appearing at the terminals 611, 612 and 613 simultaneously go to a 1 level, the signal shown at 213 in FIG. 2 and having a 0 level in the address 2 is produced at the output of a NAND gate $7a_1$. The signal 213 is applied to one input of a NOR gate $7a_2$, while the output signal of the 2nd stage flip-flop F/F-2 in the frequency divider 2 of FIG. 3 (FIG. 2-207) is applied to the other input of the NOR gate $7a_2$ after it has been delivered to the terminal $Q_2$ in FIG. 6 and inverted by an inverting gate 7m. Consequently, the signal shown at 215 in FIG. 2 appears at the output of the NOR gate $7a_2$ only in the address 2.

On the other hand, if the switch $S_{A2}$ corresponds to the address 83, then the signal representing the address 83 is obtained by connecting the terminal 6a-3 of FIG. 4 to a terminal 621 in FIG. 6, the terminal 6b-80 of FIG. 4 to a terminal 622 in FIG. 6 and the terminal 6c-000 of FIG. 4 to a terminal 623 shown in FIG. 6. In other words, when the switch $S_{A2}$ is open and the signals appearing at the terminals 621, 622 and 623 simultaneously go to the 1 level, the signal shown at 214 in FIG. 2 and having the 0 level in the address 83 appears at the output of a NAND gate $7b_1$. The output signal of the NAND gate $7b_1$ is applied to one input of a NOR gate $7b_2$ and the inverted signal of the signal 207 of FIG. 2 is applied to the other input of the NOR gate $7b_2$. Consequently, the signal shown at 215 in FIG. 2 appears at the output of the NOR gate $7b_2$ only in the address 83. In this way, the addresses for other switches may be designated by suitably selecting and connecting the output terminals of the address signal generator 6 shown in FIG. 4. All of the signals thus produced are combined by a NOR gate 7k and inverted by an inverting gate 7l. The output signal of the inverting gate 7l has the waveform shown at 215 in FIG. 2 and it drives a transistor 7n through a resistor $R_0$. As a result, in accordance with the address designation, the corresponding command pulses are superposed at a terminal $l'_3$ of FIG. 6 which is connected to the signal line $l_3$ in FIG. 1, and these command pulses appear in the addresses 2 and 83 as shown in FIG. 2-210. In FIG. 6, a block T designates a transmitting unit and a plurality of transmitting units of the same construction are connected in parallel. The function of signal transmission from the local A has been described so far.

The transmission of signals from the local B will now be described. In FIG. 1, the construction of the local B is identical with the local A except that it does not include the reference signal generator 3. Numeral 1B designates an oscillator which oscillates at the same frequency as the oscillator 1 in the local A to produce an output pulse signal. Numeral 2B designates a frequency divider, 4B a timing signal generator, 5B a synchronous signal generator, 6B an address signal generator, 7B a transmitter, 8B a receiver. The oscillator 1B in the local B is rarely operated in synchronism with the oscillator 1 in the local A upon closing of the power supply circuit. Therefore, in the local B, as shown at 208' in FIG. 2, the phase of the output signal corresponding to the output signal of the inverting gate 5b of the synchronous signal generator 5 in FIG. 4 is shifted with respect to that of the corresponding signal generated in the local A and shown at 208 in FIG. 2. Consequently, as shown at 209' in FIG. 2, the synchronous signal also differs in phase with the corresponding signal generated in the local A. However, since at least one pulse of the synchronous signal appears only in the interval a of the reference signal 206 shown in FIG. 2, the locals A and B always operate in synchronism with each other. The output signal of the timing signal generator 4B in the local B which corresponds to the output signal of the NAND gate 4b has the waveform shown at 211' in FIG. 2, and the timing signal corresponding to the output signal of the NAND gate 4d has the waveform shown at 212' in FIG. 2. While the pulse width of the timing signal 212' differs from that of the timing signal 212 generated in the local A, the duration of the period is the same so that the address signals generated by the address signal generator 6B in the local B and those generated by the address signal generator 6 in the local A are in synchronism without any phase difference.

Assuming now that the address 4 is allotted to the switch $S_{B1}$ of the switches $S_{B1}, S_{B2}, \ldots, S_{B9}$ which are provided in the local B to associate with the corresponding electrical devices, by making the necessary connections as required for the previously described address designation in the local A, the same operation as in the case of the local A takes place, with the result that the signal shown at 216 in FIG. 2 appears at the output corresponding to the output of the NAND gate $7a_1$ and the signal shown at 217 in FIG. 2 is generated at the output corresponding to the output of the inverting gate 7e. Consequently, as shown in FIG. 2-210, a signal appears in the reference signal which is indicative of the superposition of the command signal in the address 4. While the signal appearing in the address 4 has the waveform different from that of the signals superposed in the addresses 2 and 83 by the local A, no command signals other than those consisting of two or three pulses appear in any address, even there is any phase shift between the output pulse signals from the oscillators. The other switches in the local B can send their signals by suitably selecting and connecting the output terminals of the address signal generator 6B in a similar manner as in the case of the switch $S_{B1}$. The function of signal transmission from the local B has been described so far.

Figure 7:
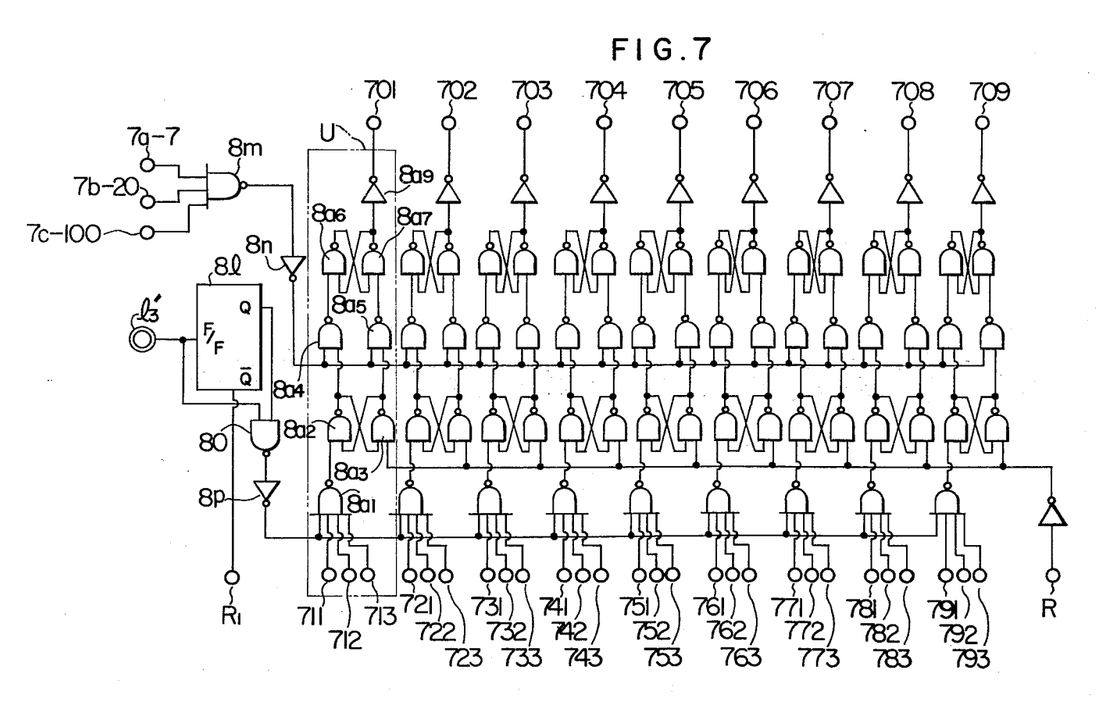
FIG. 7 is a wiring diagram showing the detailed circuit construction of the receiver used in the embodiment of FIG. 1.

Next, the construction and operation of the receiver 8 for receiving the multiplexed signal transmitted thereto in the manner described above will be set forth. FIG. 7 illustrates a wiring diagram of the receiver 8 in the local A. In FIG. 7, a terminal $l'_3$ is connected to the signal line $l_3$ in FIG. 1, and the multiplexed signal (FIG. 2-210) comprising the reference signal with the command pulses superposed thereon is delivered to the terminal $l'_3$.

The multiplexed signal 210 delivered to the terminal $l'_3$ is applied to the input of a flip-flop 8$l$ which is reset by the timing signal 211 generated at the output of the timing signal generator 4, i.e., the output of the NAND gate 4b in FIG. 4. Consequently, the signal generated at a Q output of the flip-flop 8$l$ and the multiplexed signal 210 are applied to a NAND gate 8o to determine whether each of the addresses contains two or more pulses.

In other words, the number of pulses superposed in each of the addresses of the multiplexed signal shown at 210 in FIG. 2 is counted to determine which of the addresses contains the command pulses. If the multiplexed signal contains the command pulses in the addresses 2, 4 and 83 as shown in FIG. 2-210, the signal shown at 219 in FIG. 2 is generated at the output of an inverting gate 8p and this signal has the 1 level in the addresses containing the command pulses and in the interval a of FIG. 2-210 containing more than two pulses. The signal 219 is applied to one inputs of NAND gates $8a_1, 8b_1, \ldots, 8h_1$ and $8i_1$ in FIG. 7. In this case, by connecting the terminal 6a-4 of FIG. 4 to a terminal 711 in FIG. 7, the terminal 6b-00 of FIG. 4 to a terminal 712 in FIG. 7 and the terminal 6c-000 of FIG. 4 to a terminal 713 in FIG. 7, the NAND gate $8a_1$ receives the signal appearing in the address 4, and thus a signal having the 0 level only in the address 4 as shown at 221 in FIG. 2 is generated at the output of the NAND gate $8a_1$. The signal 221 is applied to the set input of a first memory circuit comprising NAND gates $8a_2$ and $8a_3$. On the other hand, the signal shown at 209 in FIG. 2 has been applied to the reset input of the first memory circuit through a terminal R thus resetting it to the initial state. Consequently, the application of the output signal of the NAND gate $8a_1$ (FIG. 2-221) causes the output of the NAND gate $8a_2$ to change from the 0 level to the 1 level and the output of the NAND gate $8a_3$ to change from the 1 level to the 0 level. The output signals of the NAND gates $8a_2$ and $8a_3$ are respectively applied to one inputs of NAND gates $8a_4$ and $8a_5$, and the memory signal shown at 223 in FIG. 2 is applied to the other inputs of the NAND gates $8a_4$ and $8a_5$. This memory signal is produced by connecting the terminals 6a-7, 6b-20 and 6c-100 of FIG. 4 respectively to terminals 7a-7, 7b-20 and 7c-100 of FIG. 7 so that a signal having the 0 level in the address 127 is generated at the output of a NAND gate 8m and the signal is inverted by an inverting gate 8n to produce the signal shown at 223 in FIG. 2. The memory signal 223 opens the NAND gates $8a_4$ and $8a_5$ so that the output of the NAND gate $8a_4$ goes to the 0 level and the output of the NAND gate $8a_5$ goes to the 1 level. The signals are then applied to a second memory circuit comprising NAND gates $8a_6$ and $8a_7$, with the result that the output of the NAND gate $8a_7$ goes to the 0 level and it is then inverted by an inverting gate $8a_9$ to produce a 1 level signal at a terminal 701. The signal thus produced is used to actuate a transistor, relay or the like, and in this way the respective electrical devices are actuated in accordance with the instructions from the associated switches. In FIG. 7, a block U designates a receiving unit, and a plurality of receiving units of the same construction are connected in parallel. The other receiving units can receive the signals superposed on the corresponding addresses by suitably selecting and connecting the output terminals of the address signal generator 6 in the manner as described above. The reception of the signals in the local B is the same as the above-described reception of the signals in the local A, and therefore it will not be described.

Figure 8:
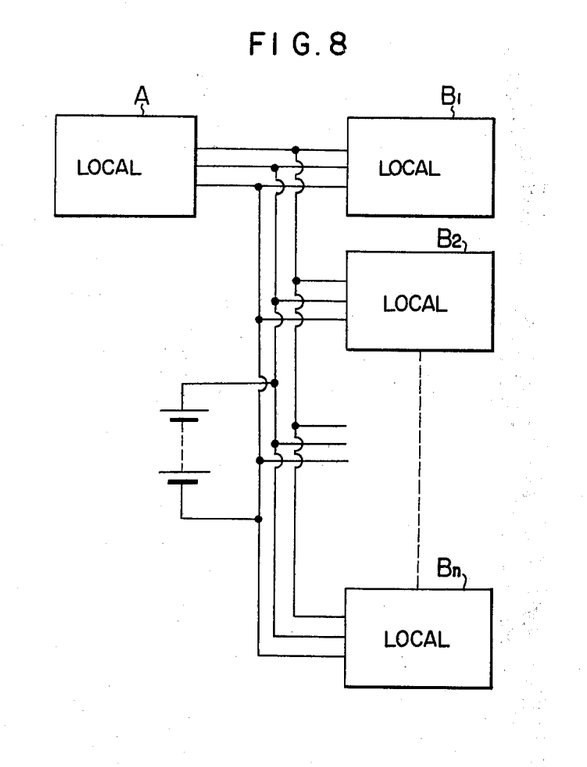
FIG. 8 is a block diagram showing another embodiment of the present invention in which a plurality of blocks are interconnected.

While, the present invention has been described with reference to an illustrative embodiment thereof, it is not intended to be limited to the details shown, since numerous other modifications and embodiments may be made without departing in any way from the scope and spirit of the present invention. For example, the number of locals is not limited to two, and $n$ locals each serving the same function as the local B may be interconnected by means of two power supply lines and a single signal line as shown in FIG. 8. Further, while, in the illustrated embodiment, the number of addresses is 126, i.e., the transmission and reception of 126 instructions is possible, it is possible to transmit and receive more than 126 instructions by increasing the number of stages in the frequency divider 2.

Furthermore, while, in the illustrated embodiment, only 9 kinds of signal transmission and reception is possible from each local, it is possible to accomplish $n$ kinds of signal transmission and reception by increasing the number of the transmitting units and the receiving units respectively to $n$. Moreover, while, in the illustrated embodiment, the synchronous signal and the command signals on the reference signals are distinguished from each other, i.e., the former consists of eight pulses and the latter consists of two or three pulses, the numbers of pulses may be selected as desired provided that the signals are distinguishable from each other. Further, the switches in the instruction units $S_A$ and $S_B$ may be of the normally-open type, and also they may be of the manually operable type or of the type which is opened and closed by automatically sensing any given operating conditions.

What is claimed is:
1. An electrical wiring system comprising:
a first circuit including;
a first oscillator for generating an oscillation pulse signal having a fixed frequency,
a reference signal generating circuit responsive to said oscillator for dividing the frequency of an output signal of said oscillator and for generating a reference signal, said reference signal having a predetermined period equal to a plurality of cycles of said divided signal and having a group of high frequency pulses at a reference time interval in said predetermined period for effecting timing,
a first address designating circuit responsive to said reference signal generating circuit for generating a first set of address signals, said first address designating circuit being operable in synchronization with said high frequency pulses in said reference signal and generating said first set of address signals for designating a plurality of addresses by time division of said predetermined period of said reference signal subsequent to the time of synchronization into a plurality of addresses, and
a transmitter logic circuit connected to said first address designating circuit, said reference signal generator and an instruction unit for generating multiplex signal, said transmitter logic circuit being operable to perform a logic processing of said first set of address signals and a command signal from said instruction unit to produce a series signals containing a series of command pulses separated from each other in respect to time and being operable to produce said multiplex signal by combining said series signal and said reference signal;

a single signal line connected to said transmitter logic circuit of said first circuit for transmitting said multiplex signal from said transmitter logic circuit; and a second circuit including;

a second address designating circuit connected to said single signal line for generating a second set of address signals, said second address designating circuit being operable in synchronization with said high frequency pulses of said reference signal contained in said multiplex signal and generating said second set of address signals for designating addresses respectively by time division of said predetermined period of said reference signal subsequent to the time of synchronization into the same number of addresses as in said first address designating circuit, and a receiver logic circuit connected to said single signal line and said second address designating circuit for controlling the actuation of each load corresponding to said command signal through a logic processing of said second set of address signals and said multiplex signal.

2. An electrical wiring system according to claim 1, wherein said reference signal generating circuit comprises a frequency divider circuit for dividing the frequency of said oscillation pulse signal of said first oscillator, and gate means for passing said oscillation pulse signal during said reference time interval in said predetermined period through a logic processing of an output of said frequency divider circuit and said oscillation pulse signal.

3. An electrical wiring system according to claim 1, wherein said first address designating circuit comprises a synchronous signal generator for producing a timing pulse, said synchronous signal generator being operable to repeat a count operation at predetermined intervals, each of said predetermined intervals being shorter than the period of said group of high frequency pulses in said reference signal, and being adapted to generate said timing pulse when a count value becomes to a predetermined value, and means for generating said first set of address signals, said means being adapted to be reset by said timing pulse from said synchronous signal generator and to perform time division subsequent to the time of reset thereby to produce said first set of address signals each representing a corresponding address.

4. An electrical wiring system according to claim 1, wherein said transmitter logic circuit comprises a plurality of logic gates for superposing on each of said series of command pulses a low frequency pulse having a lower frequency than said high frequency pulses.

5. An electrical wiring system according to claim 1, wherein said first circuit further includes a second receiver logic circuit of the same structure as said receiver logic circuit in said second circuit, and said second circuit further includes a second transmitter logic circuit of the same structure as said transmitter logic circuit in said first circuit and a second oscillator of the same structure as said first oscillator, and wherein said transmitter logic circuit in said first circuit and said receiver logic circuit of said second circuit constitute a first system for controlling the actuation of a first group of loads, and a plurality of addresses of a first region are assigned to said first system, and said second transmitter logic circuit in said second circuit and said second receiver logic circuit constitute a second system for controlling the actuation of a second group of loads, and a plurality of addresses of a second region are assigned to said second system, whereby two-way transmission between said first circuit and said second circuit is performed through said single signal line.

6. An electrical wiring system comprising:

a first circuit including;

a first oscillator for generating an oscillation pulse signal having a fixed frequency, a reference signal generating circuit responsive to said oscillator for dividing the frequency of an output signal of said oscillator and for generating a reference signal, said reference signal having a predetermined period equal to a plurality of cycles of said divided signal and having a group of high frequency pulses at a reference time interval in said predetermined period for effecting timing, a first address designating circuit responsive to said reference signal generating circuit for generating a first set of address signals, said first address designating circuit being operable in synchronization with said high frequency pulses in said reference signal and generating said first set of address signals for designating a plurality of addresses by time division of said predetermined period of said reference signal subsequent to the time of synchronization into a plurality of addresses, and a transmitter logic circuit connected to said first address designating circuit, said reference signal generator and an instruction unit for generating multiplex signal, said transmitter logic circuit being operable to perform a logic processing of said first set of address signals and a command signal from said instruction unit to produce a series signals containing a series of command pulses separated from each other in respect to time and being operable to produce said multiplex signal by combining said series signal and said reference signal;

a single signal line connected to said transmitter logic circuit of said first circuit for transmitting said multiplex signal from said transmitter logic circuit; and a second circuit including;

a second oscillator for generating an oscillation pulse signal having the same fixed frequency as said first oscillator, a second address designating circuit connected to said second oscillator and said single signal line for generating a second set of address signals, said second address designating circuit being operable in synchronication with said high frequency pulses of said reference signal contained in said multiplex signal and generating said second set of address signals for designating addresses respectively by time division of said predetermined period of said reference signal subsequent to the time of synchronization into the same number of addresses as in said first address designating circuit, a first receiver logic circuit connected to said single signal line and said second address designating circuit for controlling the actuation of each load corresponding to said command signal through a logic processing of said second set of address signals of a first region and said multiplex signal; and a third circuit including;

a third oscillator for generating an oscillation pulse signal having the same fixed frequency as said first oscillator, a third address designating circuit connected to said third oscillator and said single signal line for generating a third set of address signals, said third address designating circuit being operable in synchronization with said high frequency pulses of said reference signal contained in said multiplex signal and generating said third set of address signals for designating addresses by time division subsequent to the time of synchronization into the same number of addresses as in said first address designating circuit, and a second receiver logic circuit connected to said single signal line and said third address designating circuit for controlling the actuation of each load corresponding to said command signal through a logic processing of said third set of address signals of a second region and said multiplex signal.

* * * * *